US011605238B2

(12) United States Patent
Xu et al.

(10) Patent No.: US 11,605,238 B2
(45) Date of Patent: Mar. 14, 2023

(54) FINGERPRINT IDENTIFICATION MODULE, FINGERPRINT IDENTIFICATION METHOD, AND DISPLAY APPARATUS

(71) Applicant: BOE TECHNOLOGY GROUP CO., LTD., Beijing (CN)

(72) Inventors: Rui Xu, Beijing (CN); Xue Dong, Beijing (CN); Haisheng Wang, Beijing (CN); Yingming Liu, Beijing (CN); Lei Wang, Beijing (CN); Changfeng Li, Beijing (CN); Pinchao Gu, Beijing (CN); Xueyou Cao, Beijing (CN); Wei Liu, Beijing (CN); Xiaoliang Ding, Beijing (CN); Xiaoquan Hai, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 620 days.

(21) Appl. No.: 16/346,223

(22) PCT Filed: Nov. 1, 2018

(86) PCT No.: PCT/CN2018/113396
§ 371 (c)(1),
(2) Date: Apr. 30, 2019

(87) PCT Pub. No.: WO2019/085968
PCT Pub. Date: May 9, 2019

(65) Prior Publication Data
US 2021/0365656 A1    Nov. 25, 2021

(30) Foreign Application Priority Data

Nov. 1, 2017   (CN) .......................... 201711057831.2

(51) Int. Cl.
*G06V 40/13*    (2022.01)
*G06F 21/32*    (2013.01)
(Continued)

(52) U.S. Cl.
CPC .......... *G06V 40/1318* (2022.01); *G06F 21/32* (2013.01); *G06F 21/84* (2013.01); *H01L 27/3234* (2013.01)

(58) Field of Classification Search
CPC .................................................. G06K 9/0004
See application file for complete search history.

(56) References Cited

U.S. PATENT DOCUMENTS

2014/0294259 A1    10/2014  Lee
2016/0266695 A1*    9/2016  Bae ..................... G06F 3/04166
(Continued)

FOREIGN PATENT DOCUMENTS

CN    106024836 A    10/2016
CN    107092892 A    8/2017
(Continued)

OTHER PUBLICATIONS

Office Action dated Jul. 29, 2019, issued in counterpart CN Application No. 201711057831.2, with English translation (35 pages).
(Continued)

*Primary Examiner* — Joseph R Haley
(74) *Attorney, Agent, or Firm* — WHDA, LLP (57) ABSTRACT

A fingerprint identification module may include an array substrate (201), a plurality of point light sources (202) on the array substrate (201), and a plurality of photosensors (203) on the array substrate (201). The array substrate (201) may include a switch array (204) and a light emitting unit array (205) on the switch array (204). The plurality of point light sources (202) is configured to emit light to irradiate different regions of a finger at different times.

10 Claims, 11 Drawing Sheets

(51) Int. Cl.
*G06F 21/84* (2013.01)
*H01L 27/32* (2006.01)

(56) References Cited

U.S. PATENT DOCUMENTS

| | | | |
|---|---|---|---|
| 2017/0147853 A1 | 5/2017 | Sun et al. | |
| 2018/0033835 A1 | 2/2018 | Zeng et al. | |
| 2018/0068157 A1 | 3/2018 | Zeng et al. | |
| 2019/0013368 A1* | 1/2019 | Chung | H01L 27/30 |
| 2019/0034686 A1* | 1/2019 | Ling | G06K 9/00053 |
| 2019/0065717 A1* | 2/2019 | Won | G09G 3/20 |

FOREIGN PATENT DOCUMENTS

| | | |
|---|---|---|
| CN | 107122742 A | 9/2017 |
| CN | 107230698 A | 10/2017 |
| CN | 107748874 A | 3/2018 |

OTHER PUBLICATIONS

International Search Report dated Feb. 1, 2019, issued in counterpart Application No. PCT/CN2018/113396 (11 pages).

Office Action dated May 8, 2020, issued in counterpart CN Application No. 201711057831.2, with English Translation. (19 pages).

\* cited by examiner

FINGERPRINT IDENTIFICATION MODULE, FINGERPRINT IDENTIFICATION METHOD, AND DISPLAY APPARATUS

CROSS-REFERENCE TO RELATED APPLICATIONS

This application claims benefit of the filing date of Chinese Patent Application No. 201711057831.2 filed on Nov. 1, 2017, the disclosure of which is hereby incorporated in its entirety by reference.

TECHNICAL FIELD

The present disclosure relates to display technology, and in particular, to a fingerprint identification module, a fingerprint identification method, and a display apparatus.

BACKGROUND

Fingerprint identification refers to a method of personal identification based on comparison of detailed characteristics of different fingerprints. Each person's fingerprint is different, and there is clear difference in fingerprints even among the ten fingers of the same person. Thus, the fingerprint can be used for personal identification. The method of fingerprint identification mainly includes three types: capacitive, optical, and ultrasonic. It is very difficult for the capacitive type to read signals due to very small capacitance signals when the distance between the finger and the sensor electrode is more than 300 µm. The capacitive type of fingerprint identification is generally applied on a home button, for example, in a non-display area. Because there are many mediums in a display area, there is no effective method to apply the ultrasonic type of fingerprint identification in the display area. Optical fingerprint identification is a method which can be integrated into the display area.

At present, the optical fingerprint identification of the display module terminal is usually in a non-display area such as a home button. But in order to improve efficiency and accuracy of fingerprint identification, a thick cover layer is usually cut open to ensure a short distance between the finger and the optical fingerprint sensor. In addition, when a planar light source is used, and the sensor and the finger are relatively far from each other, the light reflected by valleys and ridges of the finger may interfere with each other, and accordingly the fingerprint information may not be identified.

BRIEF SUMMARY

An embodiment of the present disclosure provides a fingerprint identification module, includes: an array substrate comprising a switch array and a light emitting unit array on the switch array; a light source arranged on the array substrate; and a photosensor arranged on the array substrate, the point light source is configured to emit light to irradiate; and the photosensor is configured to receive the light reflected to identify fingerprint.

Optionally the light source is a point light source, the point light sources are arranged in rows and columns to form a point light source array.

Optionally the point light sources is in a same layer as the light emitting unit array or the switch array.

Optionally the point light sources includes light sources at a non-light emitting area of the module.

Optionally the point light sources includes light emitting units in the light emitting unit array.

Optionally the light source is an OLED, an LED, or a MicroLED.

Optionally the photosensor and the switch array are produced by a same manufacturing process.

Optionally the photosensor includes an inorganic photosensitive material or an organic photosensitive material.

Another embodiment of the present disclosure releases to a fingerprint identification method using the fingerprint identification module, the method includes: controlling the plurality of point light sources to emit the light at different times to respectively illuminate the different regions of the finger and the light being reflected by the finger to the photosensors; the photosensors are configured to form images for the different regions of the finger based on intensity of the light received by the photosensors, and to form an image for an entire fingerprint based on the images for the different regions of the finger.

Optionally controlling the plurality of point light sources to emit the light at different times to respectively illuminate the different regions of the finger comprises: illuminating only one of the plurality of point light sources at a time.

Optionally controlling the plurality of point light sources to emit the light at different times to respectively illuminate the different regions of the finger comprises: illuminating at least two spaced point light sources of the plurality of point light sources at a same time.

Optionally the point light source array is an array formed by an odd number of point light sources, a point light source at a center of the array is first illuminated, and point light sources at corners of the array are then sequentially or simultaneously illuminated, and point light sources located at positions between the corners of the array are finally sequentially or simultaneously illuminated.

Optionally the point light source array is an array formed by an even number of point light sources, point light sources arranged at odd numbers in the point light source array are first sequentially or simultaneously illuminated, and point light sources arranged at even numbers in the point light source array are then sequentially or simultaneously illuminated.

In another aspect, the present invention provides a display apparatus, the display apparatus includes the fingerprint identification module as above

BRIEF DESCRIPTION OF THE DRAWINGS

The accompanying drawings, which are incorporated in the specification, illustrate embodiments of the present disclosure. It is apparent that the drawings in the following description are only some of the embodiments of the present disclosure, and other drawings may be obtained from those skilled in the art without departing from the disclosure.

DETAILED DESCRIPTION

The present disclosure will be explained in further detail with reference to the accompanying drawings and embodiments in order to provide a better understanding by those skilled in the art of the technical solutions of the present disclosure. Throughout the description of the disclosure, reference is made to FIGS. 1-10. When referring to the figures, like structures and elements shown throughout are indicated with like reference numerals.

In addition, the drawings are merely schematic representations of the present disclosure and are not necessarily on scale. Some of the block diagrams shown in the figures are functional entities and do not necessarily correspond to physically or logically separate entities.

In the description of the specification, references made to the terms "some embodiments," "some example embodiments," and "exemplary embodiments," "example," and "specific example," or "some examples" and the like are intended to refer those specific features and structures, materials or characteristics described in connection with the embodiment or example that are included in at least some embodiments or examples of the present disclosure. The schematic expression of the terms does not necessarily refer to the same embodiment or example. Moreover, the specific features, structures, materials or characteristics described may be included in any suitable manner in any one or more embodiments or examples.

A numerical range modified by "approximately" herein means that the upper and lower limits of the numerical range can vary by 10% thereof. A number modified by "approximately" herein means that the number can vary by 10% thereof.

Unless otherwise defined, technical terms or scientific terms used in this disclosure should have an ordinary meaning understandable to those of ordinary skill in the art to which this disclosure pertains. "First," "second," and similar words used in this disclosure do not denote any order, quantity or importance, but only distinguish between different components. "Including," "comprising," and similar terms mean that the elements or objects preceding the word cover the elements or objects listed after the word, but do not exclude additional elements or objects. "Coupled," "connected," and the like are not limited to physical or mechanical connections, but may also include electrical connections, whether direct or indirect. "Up," "down," "left," "right," and so on are used only to represent the relative positional relationship. When the absolute position of the object to be described changes, the relative positional relationship may also change accordingly. When an element such as a layer, a film, a region or a substrate is referred to as being "on" or "under" another element, the element may be "directly" located on or under another element, or there may be an intermediate element. The terms "a," "an," "the" and "said" are used to indicate the presence of one or more elements, components, etc.

Figure 1:
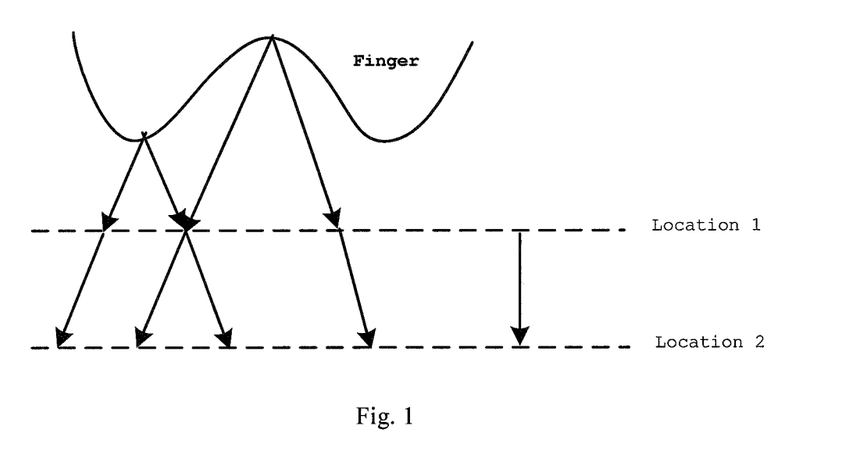
FIG. 1 is a schematic diagram showing an optical path of fingerprint identification in the related art.

FIG. 1 is a schematic diagram of an optical path for fingerprint identification using a planar light source in the related art. The planar light source has a large light-emitting area and can emit light signals at different directions. The light can be incident on the finger from different directions and different angles. When the light is reflected by the finger, the reflected light also follows various directions. If the light path is long, some of the reflected light will cross each other. As such, the fingerprint information cannot be identified. As shown in FIG. 1, when the light from the planar light source radiates outward and reaches the finger, if the sensor is relatively close to the finger (location 1), the light reflected by the valleys and the ridges of the fingerprint does not cross or overlap. As such, no confusion of fingerprint information occurs. However, if the sensor is far from the finger (location 2), the light reflected by the valleys and the ridges of the fingerprint cross or overlap each other, thereby resulting in confusion of fingerprint information. Accordingly, the fingerprint information cannot be identified.

Figure 2:
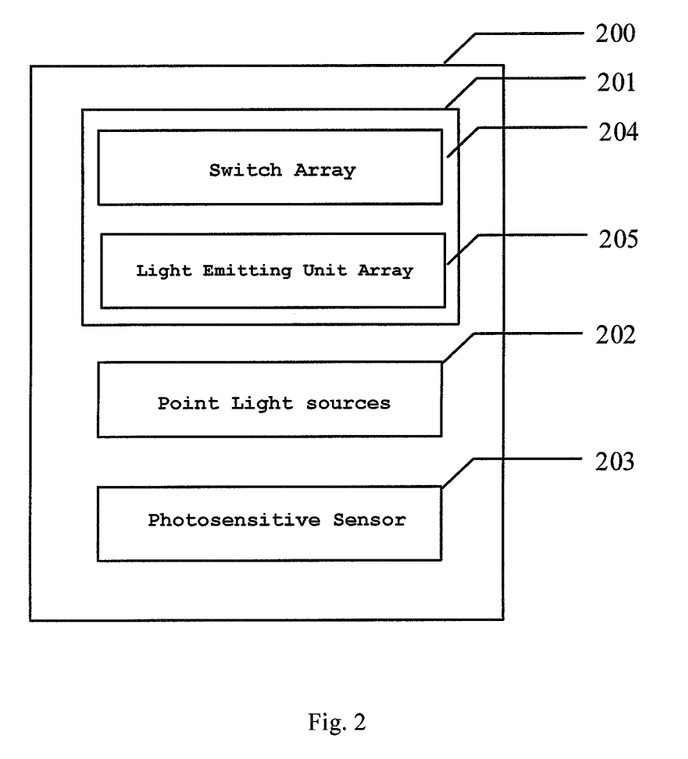
FIG. 2 is a schematic diagram of a fingerprint identification module according to one embodiment of the present disclosure.

FIG. 2 shows a schematic diagram of a fingerprint identification OLED module according to one embodiment of the present disclosure. As shown in FIG. 2, the fingerprint identification OLED module 200 includes an array substrate 201, a plurality of point light sources 202 and photosensors 203. The array substrate 201 includes a switch array 204 and a light-emitting unit array 205 on the switch array 204. The plurality of point light sources 202 is located on the array substrate 201 and is used for emitting light to irradiate different regions of the finger at different times respectively, and the light is then reflected by the finger. The photosensors 203 are located in the array substrate 201 and are used for receiving light reflected by the finger to identify the fingerprint.

In an embodiment of the present disclosure, the fingerprint identification OLED module adopts point light sources as light sources, and the photosensors are disposed in the array substrate. The plurality of the point light sources is controlled according to different times and regions to emit light to irradiate different positions of the finger. The light is then reflected by the finger to the photosensors. The light signals are then converted into electrical signals by the photosensors to finally form an image for an entire fingerprint. On one hand, such a module can prevent interference of reflected light in identifying the fingerprint. On the other hand, by integrating a plurality of fingerprint images obtained when the finger is irradiated at different times and different regions into an image for an entire fingerprint, the efficiency and accuracy of fingerprint identification are improved. Furthermore, the photosensitive sensors are disposed in the array substrate, thereby reducing volume of the OLED module and improving the integration.

In one embodiment of the present disclosure, the point light sources 202 may be disposed in the same layer as the switch array 204 or the light emitting unit array 205. A person of ordinary skill in the art may adjust the specific location of the point light sources 202 in each layer according to actual needs. The point light sources 202 in the present disclosure may be independent light sources located in the non-light emitting area of the OLED module 200, or may be a light emitting unit in the light emitting unit array 205. In one embodiment, the point light sources 202 include one or more of an OLED, an LED, and a MicroLED. The plurality of point light sources 202 can be arranged in rows and columns to form a point light source array.

Figure 3A:
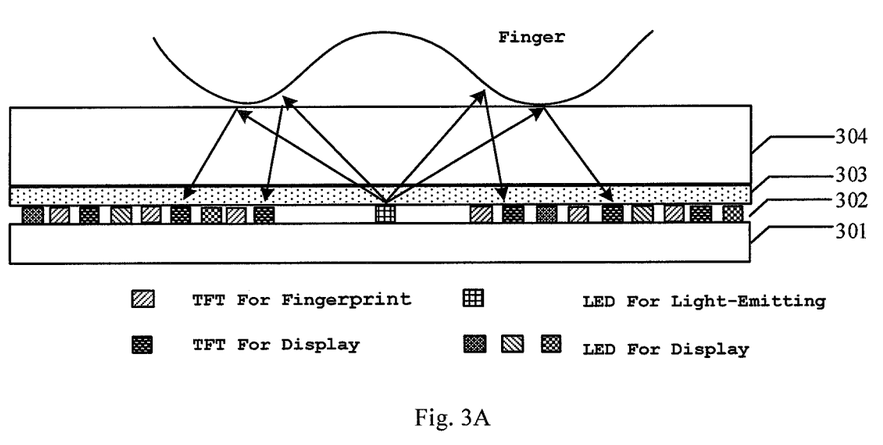
FIGS. 3A&3B are schematic cross-sectional diagrams of a fingerprint identification module according to one embodiment of the present disclosure.
Figure 3B:
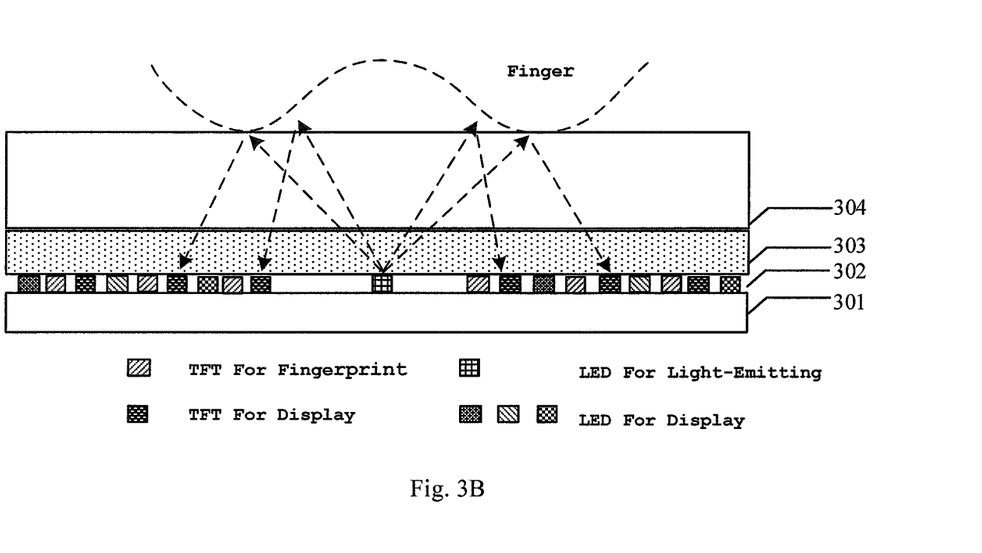

FIGS. 3A and 3B are schematic cross-sectional diagrams of a fingerprint OLED module where the point light sources are disposed in the same layer as the light emitting unit array according to one embodiment of the present disclosure. The structure includes an array substrate 301, a light emitting layer 302, a polarizer 303, and a glass protective layer 304 from bottom to top. The structure may also include an electrode layer, an encapsulation layer, a touch layer, and the like, which are not shown. The light emitting layer 302 is provided with light emitting LEDs, thin film transistors for fingerprint identification, thin film transistors for display, and display LEDs. The light-emitting LED emits light signals, which transmit through the polarizer 303 and the glass protective layer 304 and reach the valleys and ridges of the fingerprint. The light signals are then reflected by the finger to the thin film transistors for fingerprint identification, which receive the reflected light signals and convert them into electrical signals to finally form a fingerprint image.

FIG. 3A is a schematic diagram of an optical path when the fingerprint interface is close to the point light sources, and FIG. 3B is a schematic diagram of an optical path when the fingerprint interface is far away from the point light sources. As can be seen from the FIGS. 3A and 3B, when point light sources are used as illuminating sources, regardless of the distance between the fingerprint interface and the point light sources, the light signals reflected by the finger do not interfere with one another. As such, the fingerprint information can be clearly identified.

Figure 4:
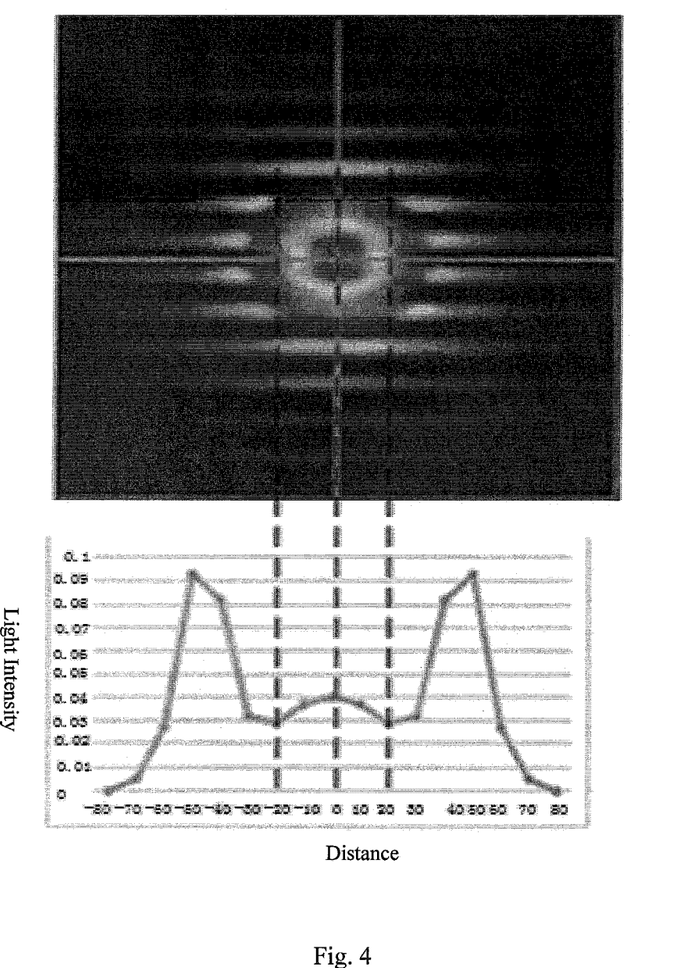
FIG. 4 shows intensity of light reflected by a finger using a point light source for realizing fingerprint identification by simulation according to one embodiment of the present disclosure.

FIG. 4 shows intensity of light reflected by a finger using a point light source for realizing fingerprint identification by simulation. When the light emitted by the point light source 202 is incident on the finger through the glass protective layer, the light transmits through the glass and enters the skin to be scattered at the ridge of the finger. At the valley of the finger, the light transmits through the glass and enters the air. Total reflection occurs when the incidence angle is greater than a critical angle of the glass to air. As such, fingerprint identification can be realized based on differences in intensity of light reflected by the valleys and ridges of the finger.

Figure 5:
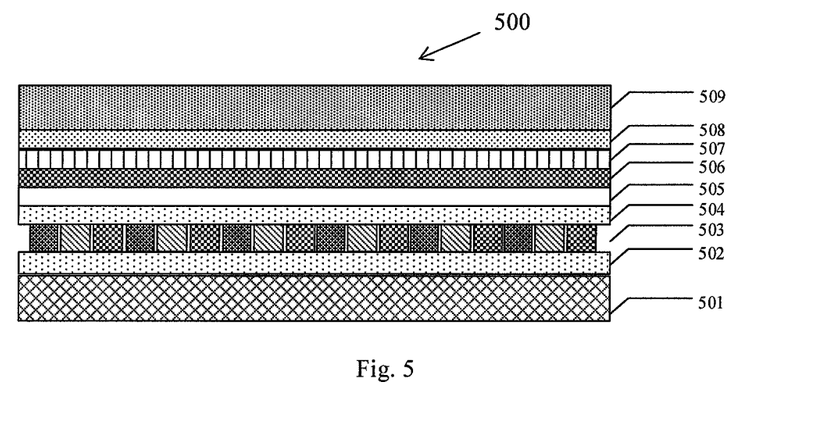
FIG. 5 is a schematic cross-sectional diagram of a fingerprint identification module according to one embodiment of the present disclosure.
Figure 6:
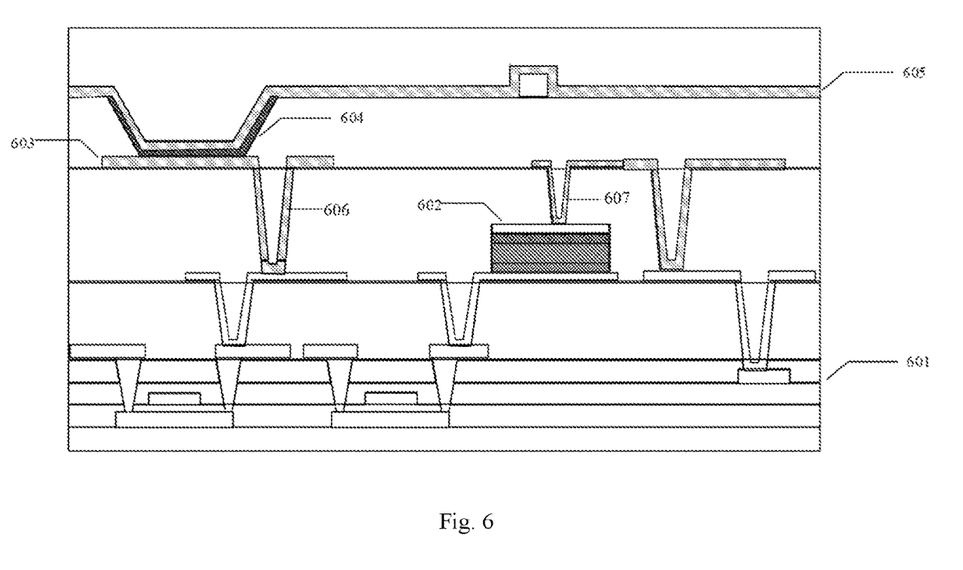
FIG. 6 is a schematic cross-sectional diagram of an array substrate integrated with photosensors according to one embodiment of the present disclosure.

Further, FIG. 5 shows a schematic cross-sectional of a fingerprint identification OLED module according to one embodiment of the present disclosure. As shown in FIG. 5, the OLED module 500 includes from the bottom to the top: an array substrate 501 integrated with photosensors, a first electrode 502, a light emitting layer 503, a second electrode 504, an encapsulation layer 505, a touch layer 506, a polarizer 507, an optical adhesive layer 508, and a protective layer 509. The protective layer 509 may be made of a rigid material or a flexible material. The rigid material may be tempered glass or organic glass, and the flexible material may be polymethyl methacrylate, polyimide, polyethylene terephthalate, polyethylene naphthalate, polyvinyl alcohol or the like. The polarizer 507 may also be a color film RGB, and the touch layer 506 may be disposed in the display area.

In one embodiment, the fingerprint identification area corresponding to the point light source needs to match the OLED display pixels to configure the photosensors. Based on the premise that the universal PPI of the fingerprint recognition is 400 in the present disclosure, the physical pixel of the matching display is designed to position the photosensors on the array substrate, and the photosensors can adopt the same process for manufacturing thin film transistors as the array substrate. In one embodiment, as shown in the array substrate integrated with the photosensors in FIG. 6, when the lead wires 606 of the thin film transistor array of the array substrate 601 are formed, electrical lead wires 607 electrically connected to the photosensors 602 are simultaneously formed. Then, an electrode layer 603 is formed on the photosensors 602 and the planarization layer, and an organic light emitting layer 604 and a second electrode layer 605 are sequentially formed on the corresponding first electrode layer 603 of the thin film transistor array. Processes of different thin film transistors such as oxide thin film transistors, amorphous silicon thin film transistors, and other thin film transistors may be used. The photosensitive material in the photosensors may be a photosensitive inorganic material or a photosensitive organic material. The photosensitive inorganic material may be silicon, and the photosensor may be a silicon PIN structure. The photosensitive organic material may be silicone acrylate or the like.

Figure 7:
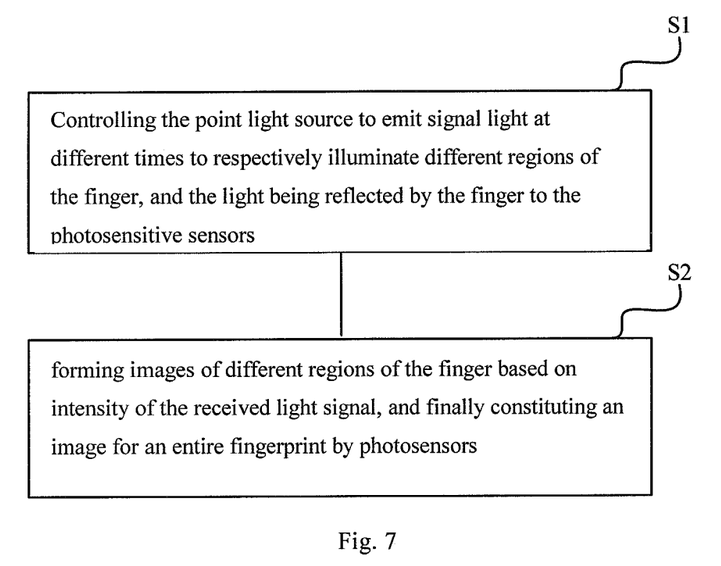
FIG. 7 is a flowchart showing a method of fingerprint identification according to one embodiment of the present disclosure.

In one embodiment of the present disclosure, a method for fingerprint identification is further provided, which is applied to the fingerprint identification OLED module 200 described above, and FIG. 7 shows a process according to one embodiment of the present disclosure:

In step S1, the point light sources 202 are controlled to emit light signals at different times to respectively irradiate different regions of the finger, and the light signals are then reflected by the finger to the photosensors 203.

In step S2, the photosensors 203 form images of each region of the finger based on the intensity of the received light signals, which finally constitute an image for an entire fingerprint.

In one embodiment of the present disclosure, a plurality of point light sources 202 is arranged in rows and columns to form a point light source array. Each of the point light sources in the point light source array is lit and emits light signals to respectively irradiate different regions of the finger according to a preset order and timing. When the point light source array is lit, only one point light source may be illuminated at a time, or a plurality of spaced point light sources may be illuminated at the same time. The point light sources illuminate the finger at different times and different regions to obtain images for different regions of the fingerprint, which eventually constitute an image for the entire fingerprint.

Further, the point light source array may be formed by an odd number of point light sources or an even number of point light sources.

Figure 8:
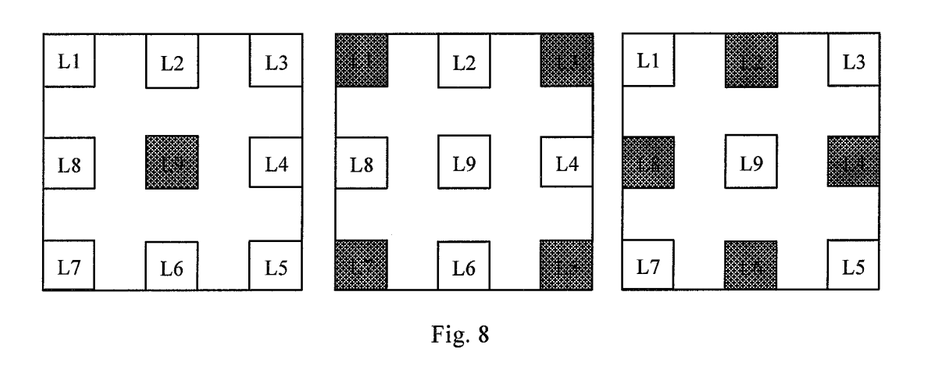
FIG. 8 illustrates a path and timing diagram of lighting a point light source array in according to one embodiment of the present disclosure.

In one embodiment, an odd number of point light sources are used to form a point light source array. FIG. 8 shows an example of a point light source array formed by nine point light sources according to one embodiment of the present disclosure. As shown in FIG. 8, the nine point light sources are point light sources L1, L2, L3, L4, L5, L6, L7, L8 located at the periphery of the array and an point source L9 located at the center of the array. In one embodiment, the order and timing of illuminating the point light source array is as follows: first, the point light source L9 is illuminated; then, L1, L3, L5, and L7 at the corners of the array are illuminated sequentially or simultaneously; and finally L2, L4, L6, and L8 at the middle points between the corners are illuminated sequentially or simultaneously. Each point light source illuminates a different region of the finger, and the photosensors 203 receive the light reflected by the finger and finally forms an image for an entire fingerprint.

In another embodiment, the order and timing of illuminating the point light source array is as follows: first, the point light source L9 is illuminated; then, two point light sources are illuminated simultaneously in the order of (L1, L3), (L2, L4), (L5, L7), and (L6, L8). By simultaneously illuminating two point light sources, fingerprint images for two regions of the finger can be obtained at the same time, thereby further improving the efficiency of fingerprint identification. Of course, those skilled in the art should understand that the order and timing of illuminating the point light source array may be other sequences, and are not limited to the orders and timings listed in the present disclosure, and are not described herein again.

Figure 9:
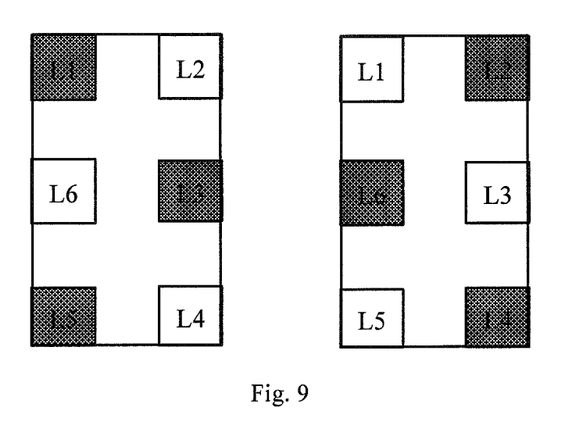
FIG. 9 illustrates a path and timing diagram of lighting a point light source array according to one embodiment of the present disclosure.

In another embodiment, an array of point light sources is formed by an even number of point light sources. FIG. 9 shows a 3×2 point light source array formed by six point light sources according to one embodiment of the present disclosure. As shown in FIG. 9, the six point light sources are respectively L1, L2, L3, L4, L5 and L6. In one embodiment, the order and timing of illuminating the point light source array may include sequentially illuminating the point light sources L1-L6. In another embodiment, first, L1, L3, and L5 may be simultaneously or sequentially illuminated. Then, L2, L4, and L6 may be sequentially or simultaneously illuminated. It should be understood by those skilled in the art that the order and timing of illuminating the above-mentioned point light source array are only illustrative, and those skilled in the art may also set other lighting paths and timings according to actual needs.

Figure 10:
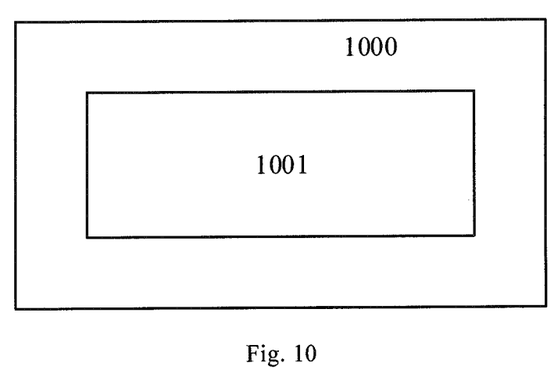
FIG. 10 is a block diagram showing structure of a display apparatus according to one embodiment of the present disclosure.

A display apparatus is also provided according to one embodiment of the present disclosure. As shown in FIG. 10, the display apparatus 1000 includes a fingerprint identification OLED module 1001 according to one embodiment of the present disclosure. The display apparatus 1000 can be a liquid crystal display, an electronic paper, an OLED display, a mobile phone, a tablet computer, a television, a notebook computer, a digital photo frame, a navigators, and products or parts with display functions.

The principles and the embodiments of the disclosures are set forth in the specification. The description of the embodiments of the present disclosure is only used to help understand the method of the present disclosure and the core idea thereof. Meanwhile, for a person of ordinary skill in the art, the disclosure relates to the scope of the disclosure, and the technical scheme is not limited to the specific combination of the technical features, and also should covered other technical schemes which are formed by combining the technical features or the equivalent features of the technical features without departing from the inventive concept. For example, technical scheme may be obtained by replacing the features described above as disclosed in this disclosure (but not limited to) with similar features.

What is claimed is:

1. A fingerprint identification module, comprising:
an array substrate comprising a switch array and a light emitting unit array on the switch array;
a light source arranged on the array substrate; and
a photosensor arranged on the array substrate,
the light source is configured to emit light to irradiate; and
the photosensor is configured to receive the light reflected to identify fingerprint;
wherein the light source is a point light source, a plurality point light sources are arranged in rows and columns to form a point light source array;
the plurality of point light sources are in a same layer as the light emitting unit array;
the plurality of point light sources are independent light sources at a non-light emitting area of the module, and the plurality of point light sources are separate from the light emitting units;
the point light source is an illuminating light source that emits light to a fingerprint to be detected, and interference of the light reflected from a fingerprint to be detected does not depend on a distance between the point light source and the fingerprint to be detected;
the plurality of point light sources are configured to emit the light at different times to respectively illuminate the different regions of the finger and the light being reflected by the finger to a plurality of photosensors; and
the photosensor and the switch array are produced by a same manufacturing process, a lead wire of the switch array and a lead wire of the photosensor is disposed in a same layer an electrode layer is disposed on the photosensor and a planarization layer, and the electrode layer is connected to the lead wire of the switch array and the lead wire of the photosensor respectively.

2. The fingerprint identification module according to claim 1, wherein the plurality of point light sources comprises light emitting units in the light emitting unit array.

3. The fingerprint identification module according to claim 1, wherein the light source is an OLED, an LED, or a MicroLED.

4. The fingerprint identification module according to claim 1, wherein the plurality of photosensors comprises an inorganic photosensitive material or an organic photosensitive material.

5. A fingerprint identification method using the fingerprint identification module according to claim 1, the method comprising:
controlling the plurality of point light sources to emit the light at different times to respectively illuminate the different regions of the finger and the light being reflected by the finger to the photosensors;
wherein the photosensors are configured to form images for the different regions of the finger based on intensity of the light received by the photosensors, and to form an image for an entire fingerprint based on the images for the different regions of the finger.

6. The fingerprint identification method according to claim 5, wherein controlling the plurality of point light sources to emit the light at different times to respectively illuminate the different regions of the finger comprises:
illuminating only one of the plurality of point light sources at a time.

7. The fingerprint identification method according to claim 5, wherein controlling the plurality of point light sources to emit the light at different times to respectively illuminate the different regions of the finger comprises:
illuminating at least two spaced point light sources of the plurality of point light sources at a same time.

8. The fingerprint identification method according to claim 7, wherein the point light source array is an array formed by an odd number of point light sources, a point light source at a center of the array is first illuminated, and point light sources at corners of the array are then sequentially or simultaneously illuminated, and point light sources located at positions between the corners of the array are finally sequentially or simultaneously illuminated.

9. The fingerprint identification method according to claim 7, wherein the point light source array is an array formed by an even number of point light sources, point light sources arranged at odd numbers in the point light source array are first sequentially or simultaneously illuminated, and point light sources arranged at even numbers in the point light source array are then sequentially or simultaneously illuminated.

10. A display apparatus, comprising the fingerprint identification module according to claim 1.

* * * * *